Jan. 27, 1942. H. K. MAIER 2,271,087
ELECTROMAGNETIC TRANSMISSION
Filed Nov. 4, 1940 2 Sheets-Sheet 1

Howard K. Maier.
INVENTOR

BY Victor J. Evans & Co.
ATTORNEYS

WITNESS

Jan. 27, 1942.	H. K. MAIER	2,271,087
ELECTROMAGNETIC TRANSMISSION
Filed Nov. 4, 1940	2 Sheets-Sheet 2

Howard K. Maier,
INVENTOR
BY Victor J. Evans & Co.
ATTORNEYS

Patented Jan. 27, 1942

2,271,087

UNITED STATES PATENT OFFICE 2,271,087

ELECTROMAGNETIC TRANSMISSION

Howard K. Maier, Mansfield, Ohio

Application November 4, 1940, Serial No. 364,298

2 Claims. (Cl. 172—284)

This invention relates to an electro-magnetic transmission and has for an object to provide a device of this character which may be substituted for the conventional fly wheel clutch and transmission of a motor vehicle and which will afford greater flexibility than conventional transmissions as well as reduce vibration to a minimum.

A further object is to provide apparatus of this type in which a direct current rotating multi-pole field produces a rotating field in an induction rotor to produce a variable torque which is controlled by the field strength and the amount of slip of the rotor.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1:
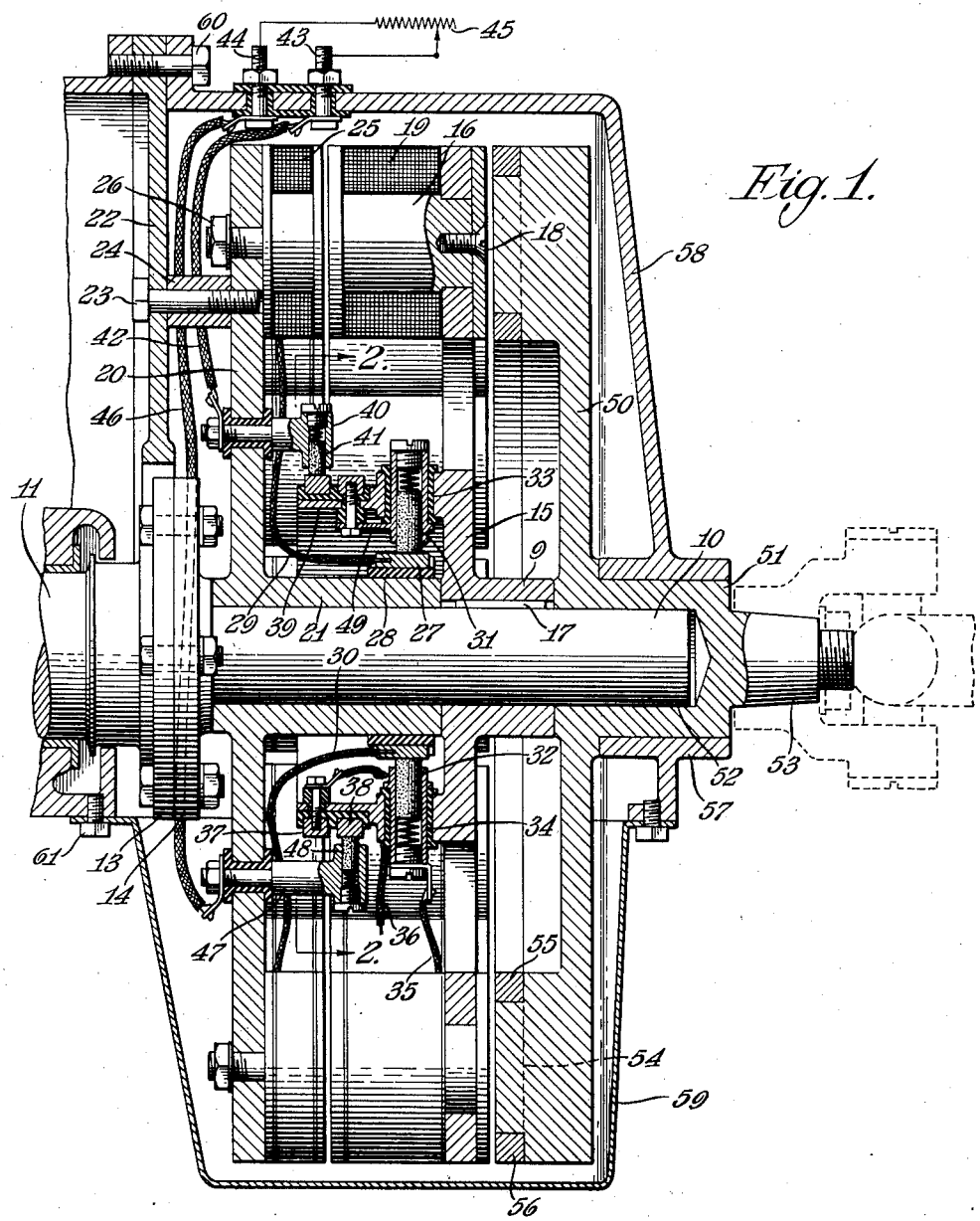
Figure 1 is a longitudinal sectional view of an electro-magnetic transmission constructed in accordance with the invention.
Figure 2:
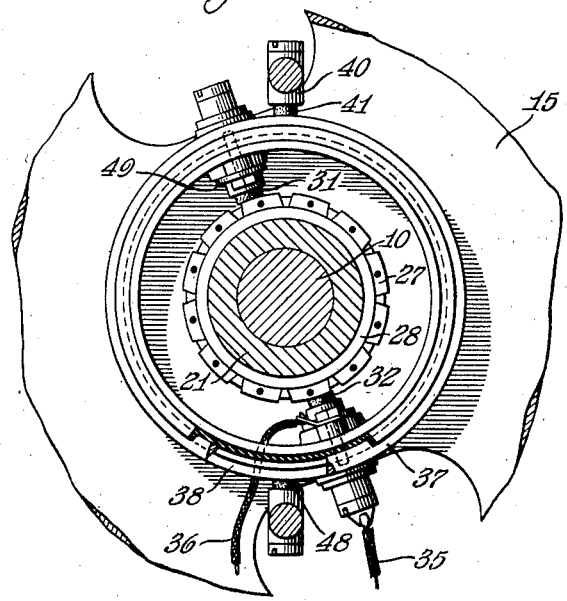
Figure 2 is a cross sectional view taken on the line 2—2 of Figure 1.

Referring now to the drawings in which like characters of reference designate similar parts in the various views, 10 designates a power driving shaft which is rigidly secured to the internal combustion engine shaft 11 of the motor vehicle by bolts 12 passed through respective flanges 13 and 14 on the engine shaft 11 and power driving shaft 10.

Figure 3:
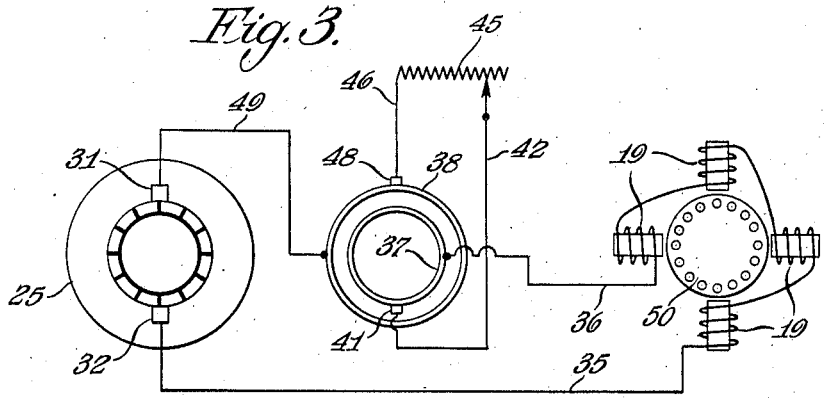
Figure 3 is a diagrammatic view showing the electrical connections of the transmission.

Rigidly mounted on the power driving shaft 10 is a non-magnetic disk 15 having a hub 9, which is keyed to the shaft 10 as shown at 17, to rotate as a unit with the shaft. An annular series of double end pole pieces 16 are secured to the disk concentric with the shaft 10 by screws 18, or other connectors, passed through the disk and into the pole pieces. About each pole piece is wound a suitable coil 19. The field coils 19 are connected in series in such a manner that when a direct current is passed through the circuit adjacent end poles on each side of the pole pieces will be of opposite polarity, as best shown in Figure 3.

A direct current disk armature is mounted on the power driving shaft 10 to confront the ends of the pole pieces next to the engine shaft 11 and comprises a disk 20 having a hub 21 through which the power driving shaft 10 loosely projects. The disk is secured stationary to the end plate 22 of the engine housing by screw bolts 23, or other connectors, on which are disposed spacers 24 to space the armature from the end plate 22.

An annular series of armature coils 25 are secured stationary to the disk 20 by screw bolts 26, or other connectors, and confront the rotatable pole pieces 16 so that during rotation of the field coils current will be generated in the armature coils and corrected by a commutator to produce direct current for exciting the field coils as will now be described.

A stationary commutator 27 is mounted on the hub 21 of the direct current disk armature and is insulated from the hub by an insulating ring 28. Conductor wires 29 and 30 connect the armature segments with the armature coils 25.

The exciting current for the rotating field coils 19 is taken from the stationary armature by brushes 31 and 32 which are mounted in suitable brush holders 33 and 34 carried by and insulated from the non-magnetic disk 15. The brush 32 is connected to one end of the field coil circuit by a conductor wire 35. A conductor wire 36 connects the other end of the field coil circuit with a slip ring 37 disposed upon and insulated from a hub 39 which is formed integral with the non-magnetic disk 15, co-axial with the power driving shaft 10 and which also carries the above mentioned brush holders 33 and 34.

There are two slip rings, the slip ring 37 just mentioned and a second slip ring 38 disposed side by side and insulated from the hub 39. The slip rings effect the carrying of exciting current from the stationary direct current commutator through the rotating brushes 31 and 32 to the field coils 19, one end of the field circuit, as previously stated, being connected to the brush 32 by the conductor wire 35, while the other end of the field circuit is connected by the conductor 36 to the slip ring 37. A stationary brush holder 40 is secured to and insulated from the direct current disk armature 20 and carries a brush 41 which bears upon the slip ring 37. The brush holder 40 is connected by a conductor wire 42 to an insulating binding post 43 to which, and a second binding post 44, a rheostat 45 is connected. The binding post 44 is connected by a conductor wire 46 to a brush holder 47 which carries a brush 48 which bears upon the slip ring 38. The slip ring 38 is electrically connected to the brush 31 which rides on the commutator by a metallic conductor clip 49.

The exciting circuit through the rotary field coils 19 from the stationary direct armature coils 25 may be traced as follows, from the pointer of the rheostat to the binding post 43, conductor wire 42, brush 41, slip ring 37, conductor 36, rotary field coils 19, conductor 35 to the brush 32 on one side of the commutator, brush 31 on the other side of the commutator, metal conductor clip 49, slip ring 38, brush 48, conductor wire 46, and binding post 44 to the other side of the rheostat.

The purpose of the rheostat which, as described, is shunted across the slip rings 37 and 38, is to throw a pre-determined resistance into the field coils to vary the magnetic strength of the field. The rheostat is used only to balance the torque required by the driven load, with power developed by the driving motor.

A squirrel cage induction rotor is free to turn on the power driving shaft 10 and confronts the rotary field poles on the opposite side from the stationary direct current disk armature. The squirrel cage induction rotor comprises a disk 50 having a hub 51 which is recessed as shown at 52 to loosely receive the end of the power driving shaft 10. The hub is integrally connected with a conventional universal joint 53 which rotates as a unit with the rotor and is connected to the propeller shaft of the motor. Bars 54 are disposed radially on the inner face of the disk concentric with the power driving shaft 10 and are connected at their inner and outer ends by short circuiting rings 55 and 56, thus forming the well known squirrel cage commonly used as a secondary winding for an induction motor.

The hub 51 of the rotor is journaled in a bearing 57 carried by the upper member 58 of a two-piece housing, the upper member and the lower member 59 of the housing being connected to the end plate 22 of the internal combustion engine by bolts 60 and 61, or other connectors.

The rotating field coils 19 produce a rotating field in the induction rotor which effects a variable torque proportionate to the field strength, the greater the strength of the field, the more nearly will the rotation of the rotor approximate the rotation of the field coils driven by the engine shaft 10 while the weaker the strength of the field, the greater will be the slip between the induction rotor and the rotating field coils.

From the above description it is thought that the construction and operation of the invention will be fully understood without further explanation.

What is claimed is:

1. An electro-magnetic transmission comprising, a driving shaft adapted to be connected to an engine shaft, an annular series of rotary field electro-magnets fixed to the driving shaft, said annular series being concentric with the shaft and the magnets extending longitudinally of the shaft, pole pieces on both ends of the magnets forming spaced annular series of pole pieces, the magnets being wound to provide adjacent pole pieces of opposite polarity on each annular series of pole pieces, a stationary direct current disk armature disposed coaxial with the magnets, armature magnets on the disk armature confronting the annular series of the pole pieces on one end of the field magnets, a hub on said disk armature through which the driving shaft loosely projects, a stationary commutator on the hub electrically connected to the armature magnets, rotating brushes carried as a unit with the field magnets engaging the commutator and electrically connected to the field magnets, a rheostat connected in series with the field magnets, a squirrel cage rotor confronting the annular series of pole pieces on the other end of the field magnets, a hub on the rotor forming a bearing for the free end of the driving shaft, a driven shaft connected to the rotor hub for rotation as a unit with the rotor, and a housing adapted to be fixed to the engine and having a hub forming a bearing for the rotor hub.

2. An electro-magnetic transmission comprising, a driving shaft adapted to be connected to an engine shaft, an annular series of rotary field electro-magnets fixed to the driving shaft, said annular series being concentric with the shaft and the magnets extending longitudinally of the shaft, pole pieces on both ends of the magnets forming spaced annular series of pole pieces, the magnets being wound to provide adjacent pole pieces of opposite polarity on each annular series of pole pieces, a stationary direct current disk armature disposed coaxial with the magnets, armature magnets on the disk armature confronting the annular series of the pole pieces on one end of the field magnets, a hub on said disk armature through which the driving shaft loosely projects, a stationary commutator on the hub electrically connected to the armature magnets, a hub fixed to the rotary field magnets concentric with and spaced radially from the commutator, a pair of brushes carried by the hub engaging the commutator, slip rings on the hub, one of the slip rings being electrically connected to one end of the field magnet circuit and to one of the brushes, the other brush being connected to the other end of the field magnet circuit, a rheostat connected across both slip rings to control magnetic strength of the field, a squirrel cage rotor confronting the annular series of pole pieces on the other end of the magnets, a hub for the rotor forming a bearing for one end of the driving shaft, a driven shaft connected to the rotor hub for rotation as a unit with the rotor, and a housing adapted to be fixed to the engine and having a hub forming a bearing for the rotor hub.

HOWARD K. MAIER.